United States Patent [19]

Tastet

[11] Patent Number: 4,792,298

[45] Date of Patent: Dec. 20, 1988

[54] MACHINE FOR AUTOMATICALLY MEASURING PORTIONS OF DOUGH

[76] Inventor: Claude Tastet, Ilot des Bordes, 64940 Moumour, France

[21] Appl. No.: 4,109

[22] Filed: Jan. 16, 1987

[51] Int. Cl.$^4$ ............................................. A21C 5/00
[52] U.S. Cl. ................................... 425/239; 222/361
[58] Field of Search ................. 222/361; 425/238, 239

[56] References Cited

U.S. PATENT DOCUMENTS 3,849,047  11/1974  Kemper ............................... 425/238
4,305,531  12/1981  Dooley et al. ................... 222/361 X
4,742,941   5/1988  Tastet ............................... 425/238 X Primary Examiner—Charles Hart
Attorney, Agent, or Firm—Collard, Roe & Galgano

[57] ABSTRACT

A machine for automatically measuring dough portions including cylindrical body (2) topped by a vertical tank (1), which hollow body (2) has its rear end closed by a circular piece (5) comprising a center hole (6) for the passage of a hollow shaft (8) which carries within the body (2) a narrow piston (7) and further forward an ejecting piston (9). The outer portion of the shaft (8) is surrounded by a coil spring (26) held back by a retainer (25), which carries a plate (27), which supports a bar (23), which connects a jack (18) positioned at the front of the machine, which jack drives the piston (15). One of the characteristics of the machine resides in that compressed air is set to the end (31) of the shaft (8), which air travels in the cavity (11) and exists through the head of the piston (9) to detach the dough portion.

10 Claims, 4 Drawing Sheets

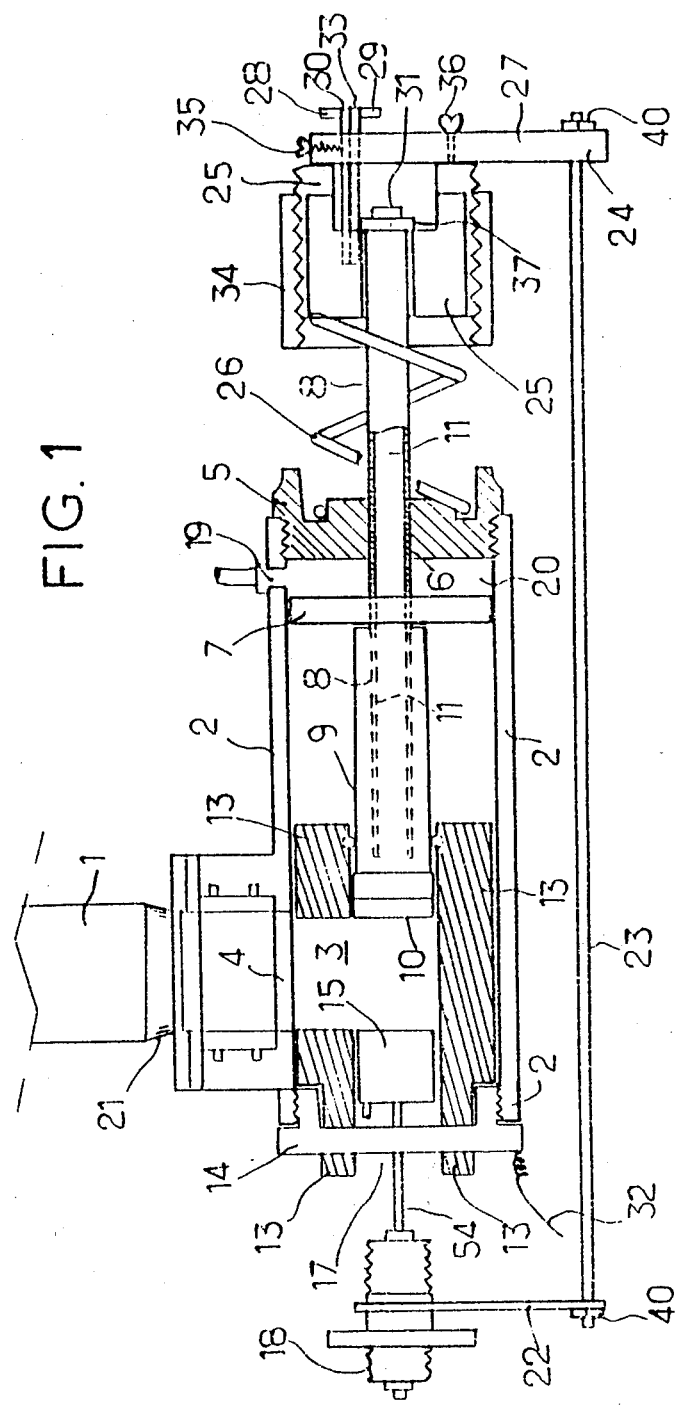

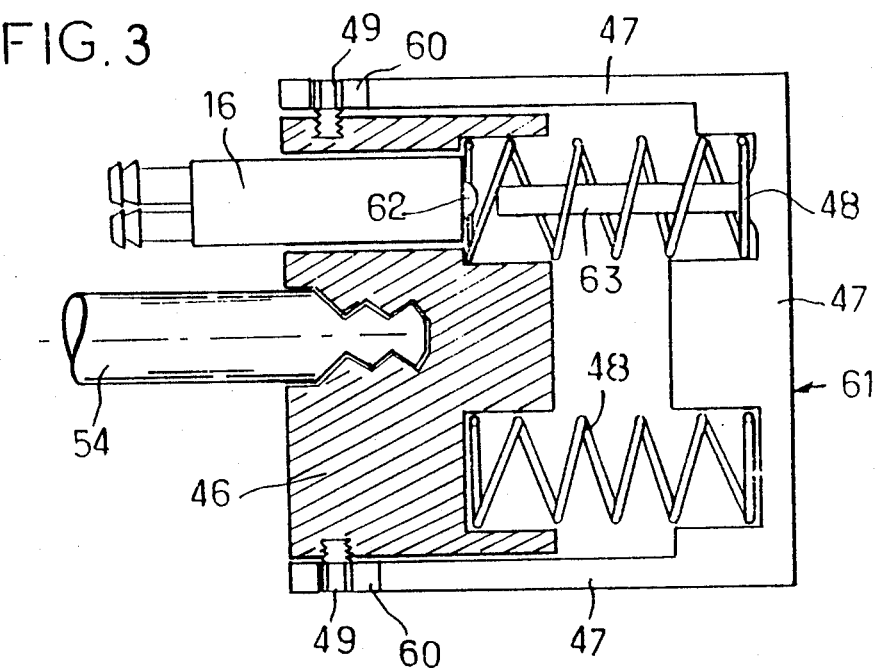
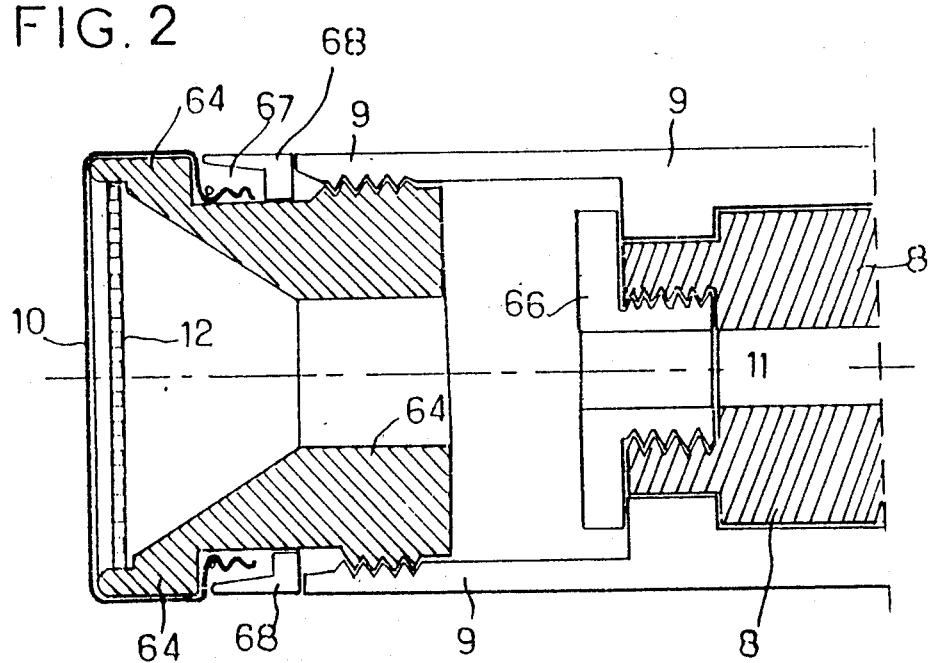

MACHINE FOR AUTOMATICALLY MEASURING PORTIONS OF DOUGH

The machine, object of the present invention, concerns an automatic volumetric measuring device for portions of dough or of any other nonfood paste but of identical viscosity.

Machines exist making it possible to divide volumes of dough into equal portions. Especially, a machine is known which works by hydraulic compression forming a large parallelepiped, which subsequently is cut into portions with knives.

Another known principle consists in filling a chamber with dough, by suction, which chamber has a predetermined volume.

The shortcoming of those machines lies in the size and mechanical complexity and in the pressures necessary for the good operation of the system. Shortcomings also in both cases because of the discomfort in use and of the indispensable daily cleaning.

To the extent that the search report of the initial French application can be taken into consideration, it is summarized below.

U.S. Pat. No. 1,762,129 (S. CHASE):
Comprises a funnel communicating with a pipe for forming a portion of material by extrusion.

GB-A No. 2050237 (Koppens Machine Fabrick B.U.):
Comprises a horizontal body topped by a funnel, within which body portions of the product are delimited mechanically.

DE-C No. 528483 (P. BLUM):
Comprises a horizontal body topped by a funnel with the purpose of mechanical delimitation of a volume and extrusion of a quantity of product.

FR-A No. 245259 (S. MARCEAU):
Comprises three pistons, whereof two measuring pistons and one piston which activates a cylindrical jacket which frees the product.

GB-A No. 817022 (Kooperativa Forbunaet Ekonomisk Forening) and FR-A No. 2383607 (R. LAURENT):
Same remarks as with respect to the preceding patents.

The machine, object of the present invention, makes it possible to eliminate these shortcomings and to obtain by its mechanical simplicity a greater reliability, a reduced bulk, and a lower cost. It further makes it possible to avoid the use of a "baller" because the dough portions are formed as balls at the exit.

The machine, object of the invention, comprises a cylindrical and hollow body positioned on a table and topped by a vertical tank at its front end.

The horizontal body of the machine contains in the rear a mobile assembly functionning as a single effect pneumatic jack and whose shaft supports at its inner end an ejecting piston, which is characterized by the fact that the ejection of the dough portion out of the machine takes place under air pressure, thus avoiding the necessity of adding flour to prevent sticking of the dough. The outer part of the rear shaft is surrounded by a coil spring held back by a retainer, which permits the return to the starting point for a new cycle. At the rear retainer, there is attached, and passing under the machine within the body of the supporting table, a bar supporting forward of the cylindrical body an assembly driven at the same time by a reciprocating movement of the rear piston and by a relative movement of its own, also reciprocating, which forward assembly is built around a single effect pneumatic jack, and which serves to determine the volume of the dough portion and the triggering of its ejection out of the machine.

The dough portion is formed in a chamber defined by the inner wall of the cylindrical body and by a measuring and ejecting piston. The various mobile elements comprise toroidal joints for good tightness, which is maintained wherever it is necessary.

The drawings attached hereto illustrate as a nonlimiting example an embodiment of the machine, together with the description below.

FIG. 1 represents an elevational view of a longitudinal section of the machine, with the mobile elements in the starting position (dough admission phase).

FIG. 2 represents, on a different scale, a longitudinal section of an ejecting piston and its means of attachment to the shaft of the machine.

FIG. 3 represents a longitudinal section of a measuring piston positioned at the front of the machine.

Figure 7:
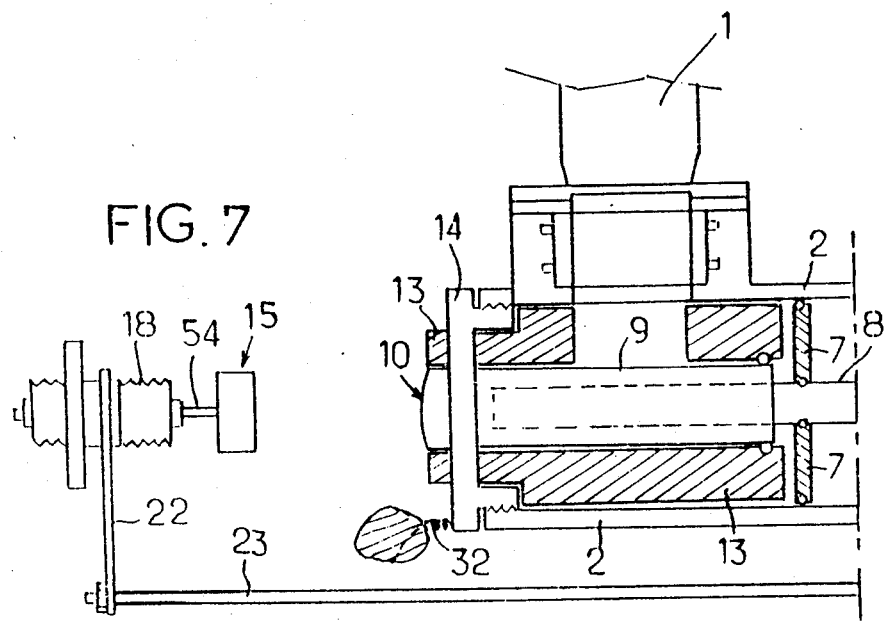

FIG. 7 partially represents a vertical section of the front end of the macine (ejection phase).

Such as represented by the complete set of figures, a circular tank 1, ending by a cone, is fastened by its smallest diameter on a horizontal and cylindrical body 2 of the machine, itself placed on a support table, which tank 1 communicates with a chamber 3 by means of an opening 4 amply provided in the body 2, which body 2 has its rear end closed by a circular piece 5 possessing a shoulder and comprising a center hole 6 for the passage of a hollow shaft 8, which carries further forward within the body 2 a narrow piston 7, and still further forward a longitudinal ejecting piston 9, which ejecting piston is characterized by that it extends a center cavity 11 of the shaft 8 and by the fact that it ends with a cloth 10 allowing air to pass under pressure coming through the center cavity 11, which cloth 10 rests on a rigid grating 12, itself letting air pass under pressure. The ejecting piston 9 in the starting position of the cycle (FIG. 1) is at the limit of the tank 1 in a circular jacket 13 which forms a chamber 3, which jacket 13 possesses an upper opening corresponding to the opening 4 of the body 2, and said jacket 13 is held at the front of the body 2 by a ring 14, which is screwed into the inner wall thereof by a shoulder.

The piston 9 in the starting position leaves a free passage to the dough which thus can fill the chamber 3, which dough by its own weight pushes a piston 15, which defines in its starting position the chamber 3 in the forward direction. The thrust of the piston 15, pushed by the dough, on its rod 54, triggers by means of a pneumatic pilot valve situated in the piston 15, the end of the filling of the chamber 3. In this way, the pilot valve 16 activates the entry of compressed air through an opening 19, which opening 19 situated in the rear of the body 2, permits the introduction of air into a chamber 20 formed by the circular piece 5 and the piston 7, which piston 7 slides forward along the inner wall of the body 2 bringing along all the elements integral with the body or placed on the shaft 8. In this way, the piston 7 pushes the piston 9, which detaches in its forward movement a portion of the upper dough and pushes the thus formed dough portion into a passage 17 comprised by the jacket 13; indeed, the passage 17 is cleared by both simultaneous movements which add their speed, of the piston 15 moving rearward, carried along by the rearward movement of the rod 54 of its jack 18, which jack 18 follows the movement of its support 22 driven in its rearward movement by a bar 23. Said bar 23 is attached to the lower end 24 of a plate 27 which is fixed to the retainer 25 of a coil spring 26, which retainer 25 is carried along by the shaft 8 towards the front of the machine.

The stroke of the piston 7 can be limited by a rear sheath 34, which is screwed on the inside onto the periphery of the retainer 25, which sheath 34 abuts against the circular piece 5 preventing the shaft 8 from following forward.

The plate 27 carries two abutting stems 28 and 29, which stem 28 carries a lug 30 designed to trigger a pilot valve which controls the passage of air under pressure into the cavity 11 of the shaft 8, and which other abutting stem 29 triggers with its lug 33 another pilot valve which controls the pneumatic jack 18 placed in front of the body 2, during its own rearward movement or of forward movement of its rod. The abutting stems 28 and 29 are adjustable and fastened in position by butterfly screws 35, and the plate 27 is attached to the retainer 25 by butterfly screws 36.

The ejection of the dough portion is characterized by that, when the shaft 8 reaches the end of the stroke (FIG. 7), the lug 30 strikes by means of the abutting stem 28 a pilot valve which triggers a vigorous entry of air through the end 31 (FIG. 1) of the shaft 8, which air travels through the whole length of the cavity 11 of said shaft 8, passes through the rigid grating 12 (FIG. 2), and the soft cloth 10, which air entry throws forward the dough portion which had traveled in the passage 17 toward the exit, separating it from the head of the piston. When the dough portion falls out of the passage 17 of the machine, it strikes a flexible steel wire 32 attached to a ring 14, which steel wire 32 controls a pilot valve which causes at the same time a cessation of the entry of air to the end 31 of the shaft 8 and the rearward return movement of the latter as well as of the mechanical assembly which is integral with it, placing the machine again in its starting position for a new cycle, with the arrival of the dough into the chamber 3.

Figure 6:
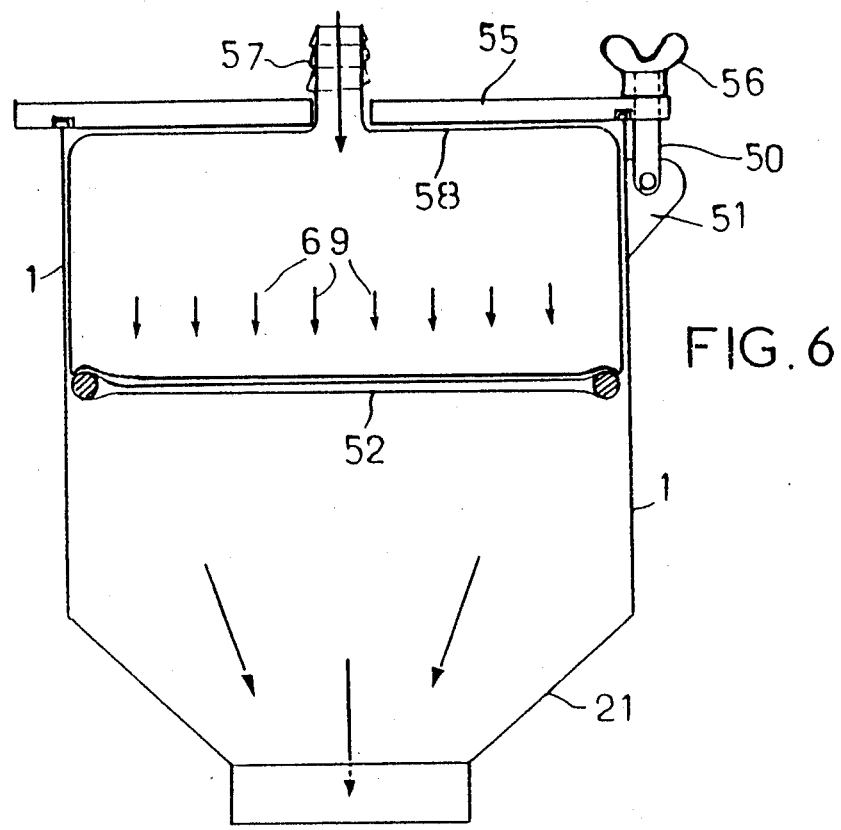
FIG. 6 represents, on a different scale, a vertical section of a half-full feed tank.

The dough comes down very gently from the tank 1 (FIG. 6), which tank 1 has a retaining shape because of its lower end 21 in the conical shape, and taking into account the texture of the dough; likewise, for the good outflow, the latter is covered by an elastic insert 59 on which is placed a balloon 58 of inflatable rubber which is held by a cover 55 attached to the tank 1 by means of four screws 50, pivotally joined at the lower end to a part 51 and immobilized with a nut 56. The balloon 58 possesses a nipple 57 which passes through the cover 55 through an opening provided for this purpose, which balloon receiving air exerts a small pressure represented by the arrows 69 over the whole area of the insert 59, causing a rational downward movement of the dough into the chamber 3 of the body 2.

The insert 59 consists of a double membrane 52, circular and elastic (latex, rubber, or any other adequate material), forming en envelope held in place and spread out thanks to an inner ring 53 (inox or plastic material), of a diameter appreciably smaller than that of the wall of the tank 1, so as to fit into the latter. The insert 59 comes down as the dough is being used up, under the pressure of the balloon 58, to the cone 21 of said tank, and the double membrane 52 assumes the shape of the cone in order to push the entire dough out of the funnel 1.

The shaft 8 passes, beyond the circular piece 5 placed at the end of the body 2, a coil spring 26 and carries at its rear end a retainer 25, which retainer 25 holds said coil spring 26 and comprises a thread on its outer wall, along which thread moves a sheath 34 which makes it possible to control the displacement of the shaft 8.

The bar 23, fastened by means of a nut 40 to the support 22 which carries the jack 18 placed in front of the body 2 and by the other end to the rear plate 27 which is subjected to the movement of the shaft 8, is driven by a reciprocating movement coordinating the displacement of the pistons 9 and 15.

Figure 4:
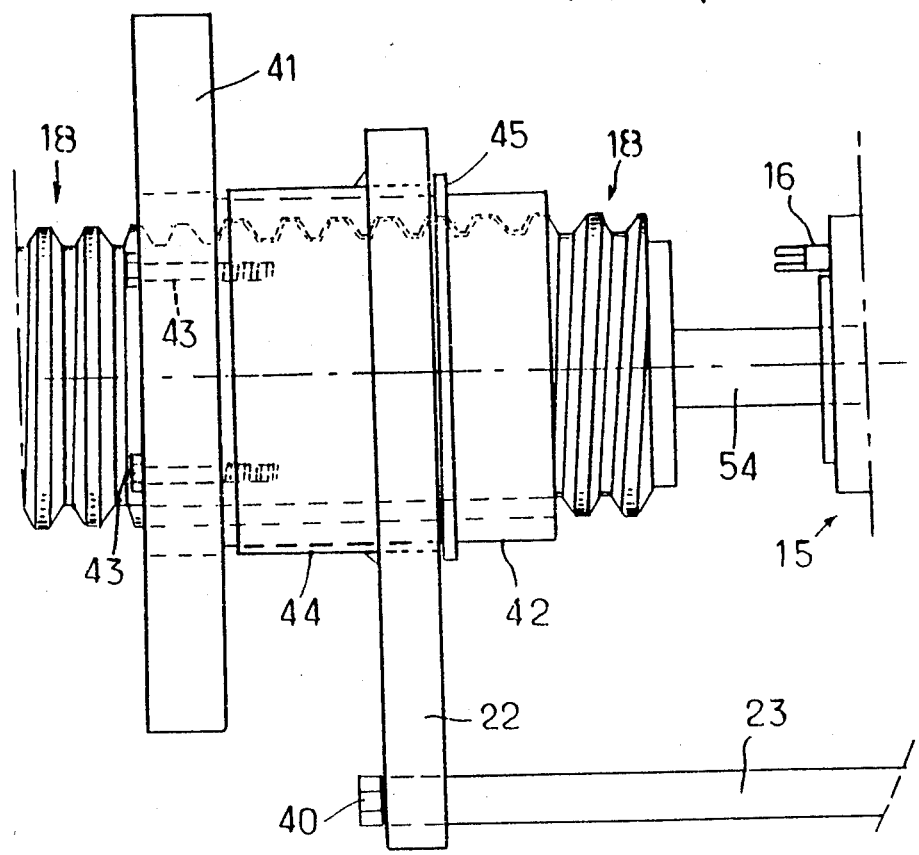
FIG. 4 represents an elevational view, on a different scale, of a jack and partially of a bar for operating the measuring piston illustrated in the preceding figure.
Figure 5:
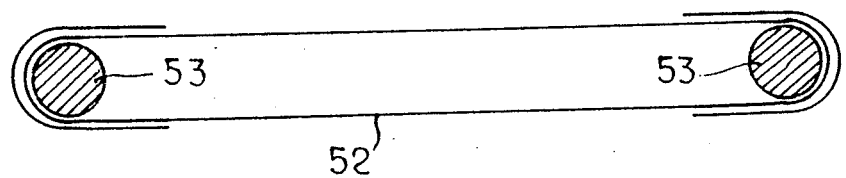
FIG. 5 represents, on a different scale, a vertical section of an insert for the upper tank.

The measuring piston 15 (FIG. 3) is mounted on a single effect pneumatic jack 18 (FIG. 4) whose position is adjustable more or less forward or rearward relative to the supporting plate 22, which position is adjustable thanks to the flywheel 41 fastened to a ring 42 by nuts 43, which ring 42 is screwed by its inner face onto the outside of the body of the jack 18, and said ring 42 slides freely with its outer surface inside the sheath 44 against which it rests by its shoulder 45 on one side and by the flywheel 41 on the other, which sheath 44 is permanently fastened to the supporting plate 22.

The measuring piston 15 (FIG. 3) consists of a body 46 screwed in its center to the rod of the jack 18, which body 46 comprises a pneumatic valve 16 and is covered by a bonnet 47 pushed forward by four springs 48 and held in the back by four guide screws 49 placed in four elongated holes 60, which bonnet 47 subjected to the pressure of the dough presses with its face 61 on the springs 48 and pushes down the head 62 of the pneumatic pilot valve 16 by means of a stem 63, thus triggering the end of measuring.

The ejecting piston 9 (FIG. 2) comprises a front nozzle 64, which is screwed by its periphery to the inner surface of the piston 9; the latter is fastened to the shaft 8 by a screw 66 which is pierced by a center hole extending the cavity 11 of said shaft 8, which front nozzle carries in front a rigid grating which is covered by a soft cloth 10, which cloth also covers the outer end of the front nozzle 64 and folds over into a peripheral cavity 67 while being held by a strap. The circular cavity 67 consists of a recess in the outer wall of the front nozzle 64, in which indentation 67 is packed the soft cloth 10 by means of a circular and hollow ring 68, which ring 68, held in a sandwichlike fashion, is blocked by the tightening of the outer wall of the piston 9.

The pneumatic circuit of compressed air is characterized by the fact that the movements of the various mechanisms are driven according to the following pattern:

starting position of the machine, phase of admission of the material originating in the tank 1 by the hole 4 toward the chamber 3, which is characterized by the admission of air into the inflatable balloon 58 and by the admission of air into the pneumatic jack 18, placing the measuring piston 15 in a forward position, thus defining the chamber 3 at the front;

end of filling of the chamber 3 determined by triggering the valve 18 of the piston 15, which valve 18 controls the entry of air through the hole 19. Simultaneously, end of entry of air into the balloon 58, which maintains the air received, and end of entry of air into the jack 18, whose rod returns to the zero position.

The arrival of the dough portion to the exit of the passage 17 causes an air pressure which exits through the cloth 10 of the piston 9, detaching said dough portion, which falls onto a steel wire 32 of a pilot valve, which causes at the same time venting of the air entered into 19 and thus return to the rear of piston 9 under the effect of the spring 26, which is released.

I claim:

1. Machine for automatically measuring dough portions comprising a circular tank (1) placed on a cylindrical and hollow body (2) placed on a supporting table, which tank (1) communicates with the body (2) by means of a large opening (4), which body (2) has its rear end closed by a circular piece (5) possessing a shoulder and comprising a center hole (6) for the passage of a shaft (8), which carries inside the body (2) a piston (7) and further forward an ejecting piston (9), which shaft (8) passes on the outside through a coil spring (26), and has its rear end which carries a spring retainer (25), on which moves a sheath 34, which limits the forward movement of the ejecting piston (9), characterized by that a chamber (3) of the body (2) is defined in the back by the ejecting piston (9) and in the front by a measuring piston (15), which moves back into a jacket (13) under the pressure of the dough which accumulates in said chamber (3), and the rearward movement of the measuring piston (15) triggers by means of a pilot valve (16) the entry of compressed air through an opening (19) placed in the back of the body (2) in a chamber (20), which causes a forward displacement of the piston (7) of the shaft (8) and of the ejecting piston (9), which ejecting piston (9) detaches a dough portion, then pushes it into a passage (17), the latter being freed from the measuring piston (15), which is carried along by the rearward movement of the body of a jack (18) which follows the movement of its support (22) driven by a bar (23), which connects a mobile assembly positioned in the back of the body (2) and by the rearward movement of the piston rod (54) of the same jack (18), both movements adding their speed.

2. Measuring machine according to claim 1, characterized by that the shaft (8), passing through the circular piece (5), is hollow over its full length, into which is injected compressed air through its rear end (31), which air travels along the shaft (8) and exits through the ejecting piston (9).

3. Measuring machine according in claim 2, characterized by that the ejecting piston (9) comprises a front nozzle (64) screwed onto the inner surface of the piston (9) itself, which is fastened to the shaft (8) by a screw (66) having a hole in its center.

4. Measuring machine according to the claim 3, characterized by that the front nozzle (64), of the ejecting piston (9) carries a grating (12) covered by a soft cloth (10), attached by means of a ring (68) held in place by screwing the outer surface of the piston onto the front nozzle (64).

5. Measuring machine according to claim 1, characterized by that the measuring piston (15) carried by the rod (54) consists of a body (46) containing a pneumatic valve (16), and is covered by a bonnet (47) held away by four springs (48), which are compressed by the pressure of the dough to permit activating the valve (16) by means of a stem (63) placed on the inner surface of the bonnet.

6. Measuring machine according to claim 5, characterized by that the rod (54) is driven by a single effect jack (18), whose position is adjustable more or less forward or backward relative to its support (22).

7. Measuring machine according to claim 6, characterized by that the control is effected by means of a flywheel (41) attached to a ring (42) by bolts (43), which ring (42) is screwed by its inner surface on the outside of the jack (18) and slides freely with its outer face inside a sheath (44) carried by the support (22).

8. Measuring machine according to claim 1, characterized by that the fall of the dough contained in the tank (1) is caused by means of an insert (59) covering said dough, on which is placed a balloon (58) inflatable by means of its nipple (57) passing through the cover (55) of the tank (1).

9. Measuring machine according to claim 8, characterized by that the insert (59) consists of a double membrane (52) forming an envelope containing a ring (53), which holds them spread out over the full circumference of the tank (1).

10. Measuring machine according to claim 1, characterized by that a plate (27), fastened at the end of the retainer (25) of the spring (26) and interdependent with the shaft (8), carries a bar (23) driven by a reciprocating movement, which supports at its front end a jack (18) by means of a support (22).

* * * * *